Aug. 4, 1936.  E. F. ZAPARKA  2,049,555
RESILIENT SUSPENSION
Original Filed Oct. 20, 1932   6 Sheets-Sheet 1
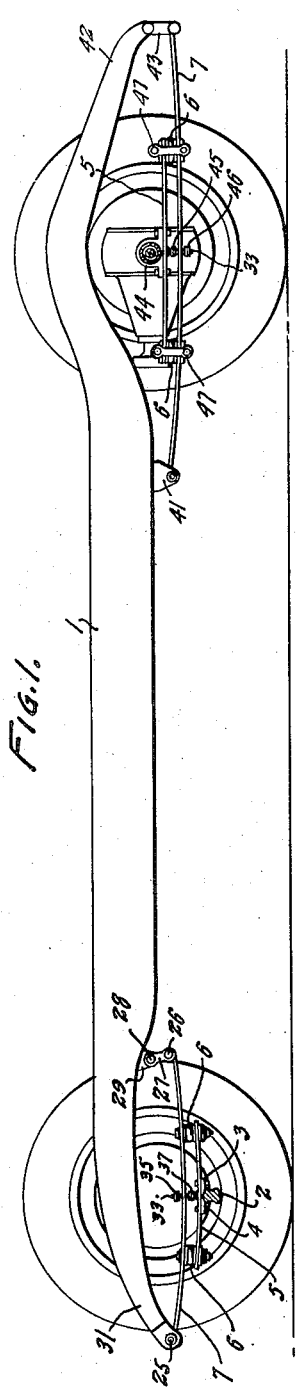
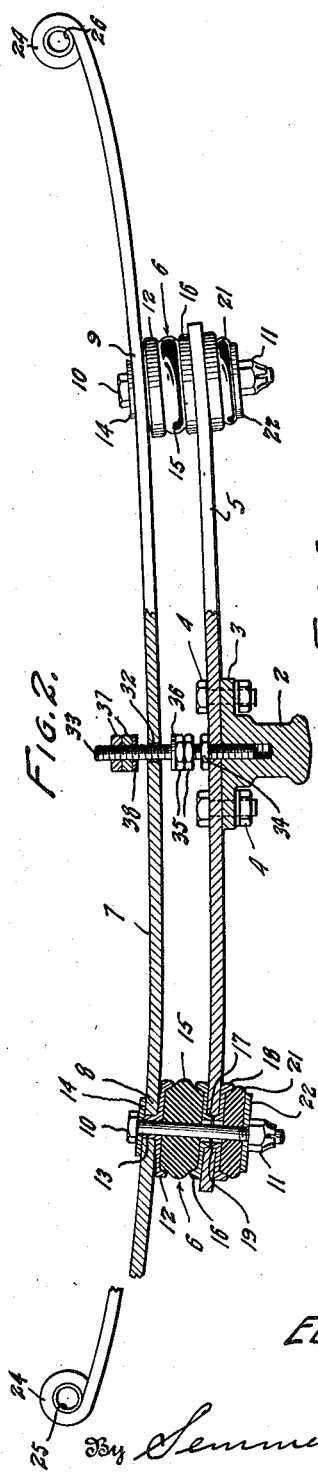
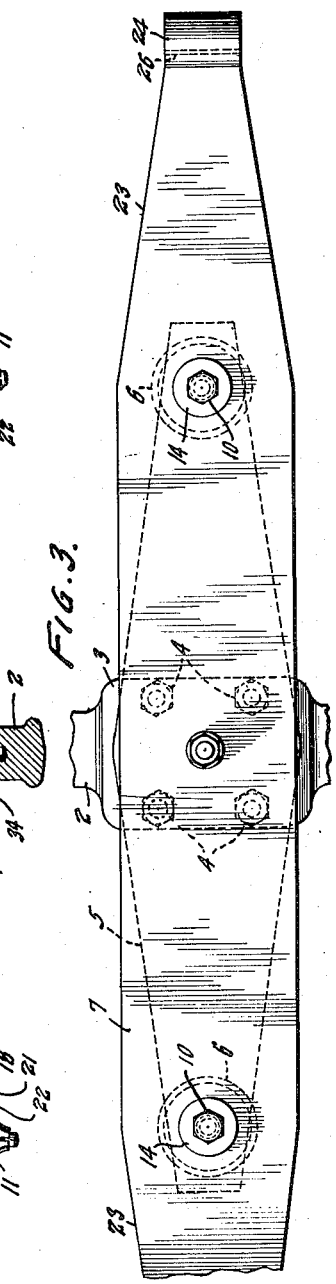
Inventor
EDWARD F ZAPARKA
By Semmes & Semmes
Attorneys Aug. 4, 1936.  E. F. ZAPARKA  2,049,555
RESILIENT SUSPENSION
Original Filed Oct. 20, 1932   6 Sheets-Sheet 2

Inventor
EDWARD F. ZAPARKA
By Semmes & Semmes
Attorneys

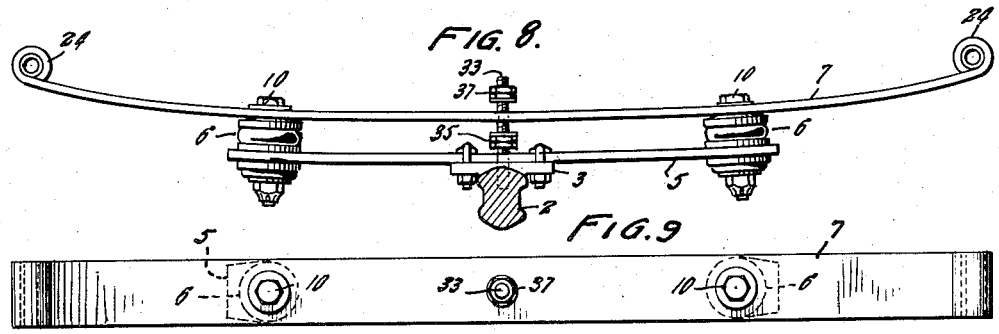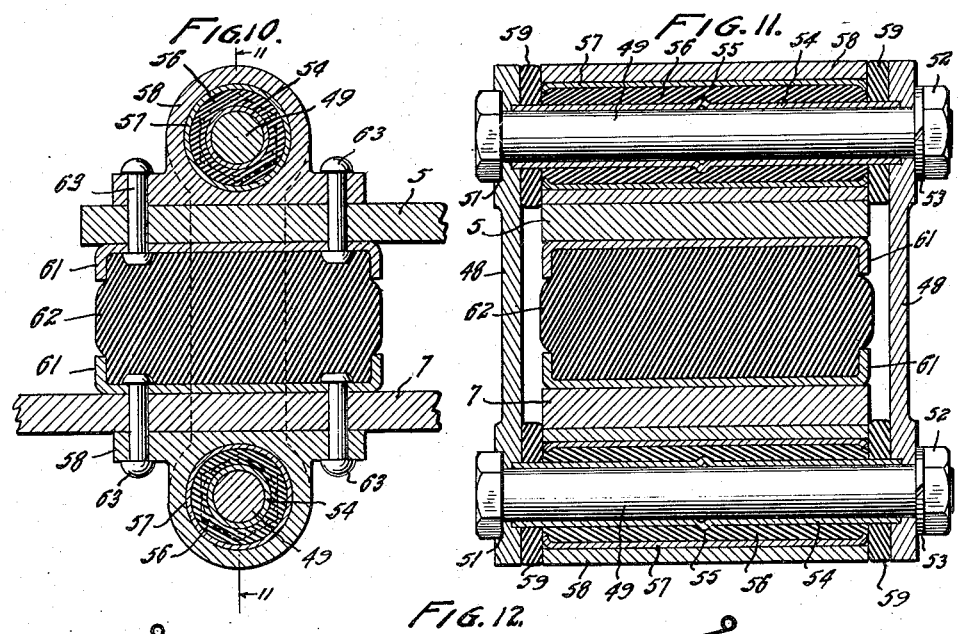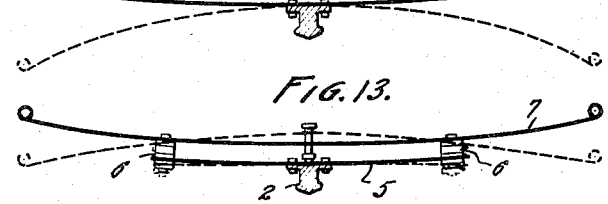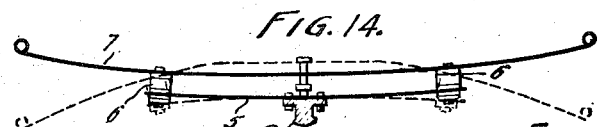

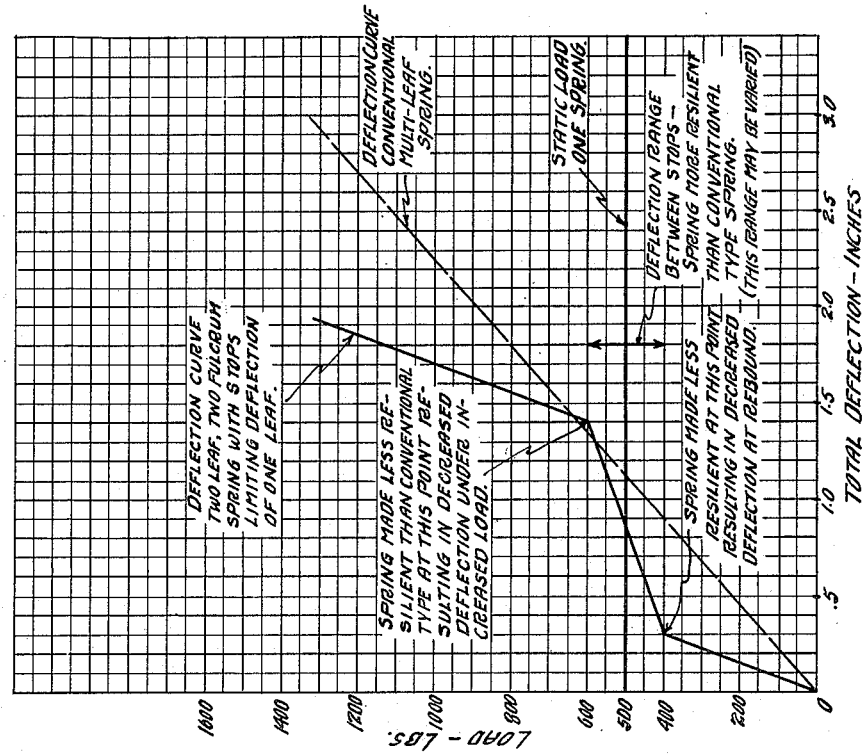
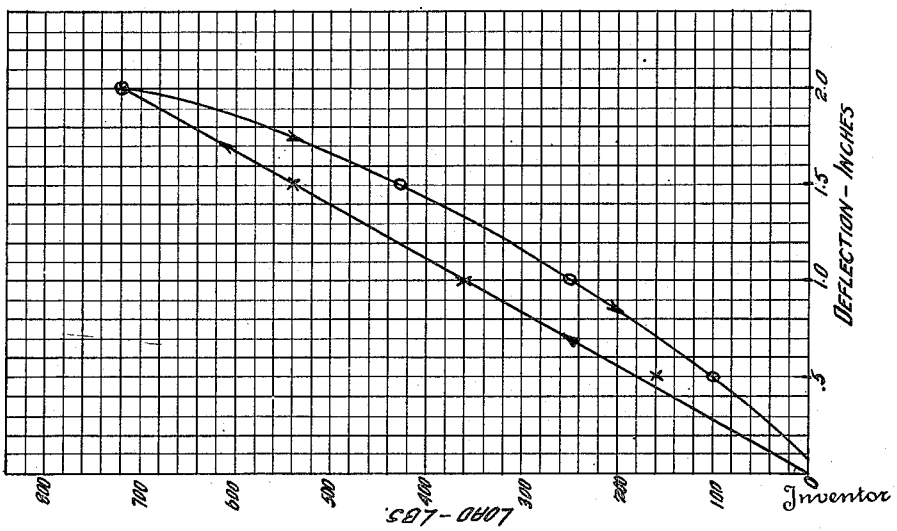

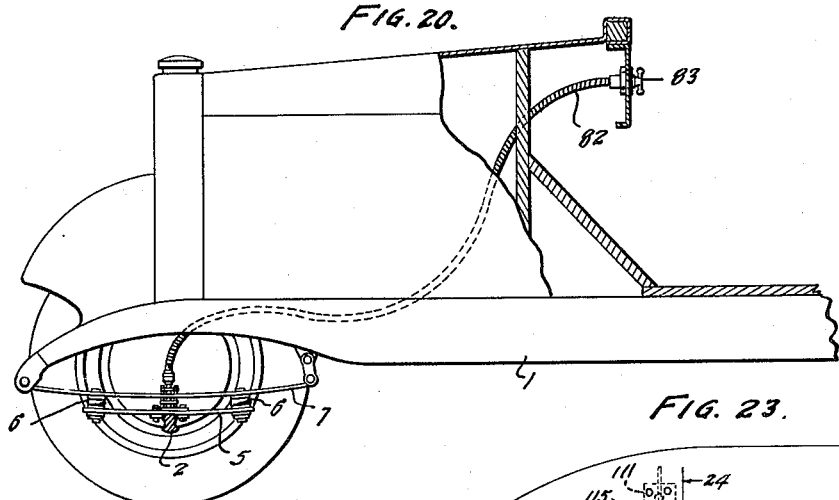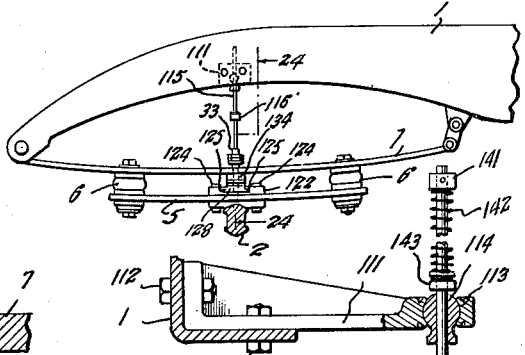

Patented Aug. 4, 1936

2,049,555

UNITED STATES PATENT OFFICE 2,049,555

RESILIENT SUSPENSION

Edward F. Zaparka, Coraopolis, Pa., assignor to Federal Spring Company, Coraopolis, Pa., a corporation of Pennsylvania Application October 20, 1932, Serial No. 638,815
Renewed January 26, 1934

43 Claims. (Cl. 267—30)

My invention relates to spring suspensions. It is adapted as a spring suspension for an automobile chassis, though it is not exclusively of use in this field.

Heretofore, where there has been an attempt to change the periodicity of a spring system, the change has usually been insufficient to effect the desired damping of the system. In some cases even, where the change in free period of vibration of the spring system is considerable, the shock imparted to the spring supported element made for inefficiency and spoiled the free riding equality of the vehicle so equipped. There are other disadvantages also inherent in the prior art which it is the purpose of my invention to overcome and which will become apparent from the ensuing description.

It is an object of my invention to permit springs of relatively light weight to support loads of greater weight than would ordinarily be possible with the usual spring suspensions; and this applies to constructions embodying my invention which have one, two or more springs in the system.

Another object of my invention is to eliminate inter-leaf friction between adjacent springs in a system while at the same time permitting at least a portion of the system to have its period changed during either or both the load deflection and rebound cycles of the spring.

It is a further object of my invention to have the operation of separate units in the spring system so correlated that the different periods of vibration of these units shall tend to damp each other to prevent vibration of the load on the system.

A still further object of my invention is to change the period of at least a portion of the system at a predetermined point in its flexion under forces of loading.

Still another object of my invention is to change the period of vibration of at least a portion of the system at some selected point in the rebound cycle of the system.

Yet another object of my invention is to permit the stops controlling the load deflection, i. e., compression, and rebound cycles to be adjusted manually. The rebound stop may be adjusted automatically.

Another object of my invention is to get the maximum spring benefit from the minimum amount of material.

Still another object is to eliminate the dead section of laminated springs, making all of the material of the spring working material, and secure uniform distribution of stress and uniform deformation.

A still further object is to provide in a spring structure independent overlapping spring members, making possible a gain in effective length.

The spring suspension of a vehicle is a function of its period of oscillation which increases with the load, and of its flexibility. A good conventional suspension under different loads has constant flexibility, or in other words, same increase of deflection for same increase of load. Therefore, successive shocks occurring to supplement each other and occurring within the free period of vibration of the system may produce such large oscillations as to be very objectionable.

I have made the discovery that abrupt change of period of vibration of the system produces oscillations of pronounced different magnitudes in each individual leaf which exercise such dampening effect on each other that they are only transmitted to the frame to a small degree.

Further, I have found that the abrupt change in vibration period of at least some of the elements in the system can be accompanied by a stiffening of the spring action, thus not only saving material by reducing the necessary size of the elements, but also improving the riding qualities.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which, for the purpose of explanation, have been made the subject of illustration.

In the drawings:

Figure 1 is a side elevation of my invention applied to the front and rear wheel ends of an automobile chassis;

Figure 2 is a detailed side elevation, partly in cross section and with part broken away, of one form of the invention as applied to the front wheel suspension of an automobile;

Figure 3 is a top plan view of the construction shown in Figure 2, part of the spring being broken away;

Figure 8 is a side elevation of a form of my invention using spring leaves of uniform width;

Figure 9 is a top plan view of the form shown in Figure 8;

Figure 10 is a cross sectional view in detail of the shackle suspension used on the rear wheels in the form of invention shown in Figure 1;

Figure 11 is a sectional view taken on the lines 11—11 of Figure 10;

Figure 12 is a diagrammatic illustration of the vibration of a leaf spring under compression load;

Figure 13 is a diagrammatic view which shows the vibration of the elements of the system under compression load in the form of device shown in Figure 1, and other figures;

Figure 14 is a diagrammatic view showing the parts in Figure 13 at the position in which the upper spring member has hit the compression stop;

Figure 15 is a graph showing normal action of the usual type of multi-leaf spring, illustrating the interleaf friction factor;

Figure 16 is a graph comparing the action of a spring such as is shown in Figure 1, with the conventional deflection curve of a multi-leaf spring;

Figure 20 is a side elevational view showing a Bowden wire connection to the dashboard of the car for regulating the stops for use in my spring system;

Figure 21 is a detail, partly in section, showing the mechanism for adjusting the stops in the form of invention shown in Figure 20;

Figure 22 is a top plan view partly in cross-section, taken on the lines 22—22 of Figure 21, looking in the direction of the arrows;

Figure 23 is a side elevation showing the application of my spring suspension to the front of an automobile chassis with an automatic means for regulating the position of the rebound stop;

Figure 24 is a detail view, partly in cross section, taken on the lines 24—24 of Figure 23, looking in the direction of the arrows.

Figure 4:
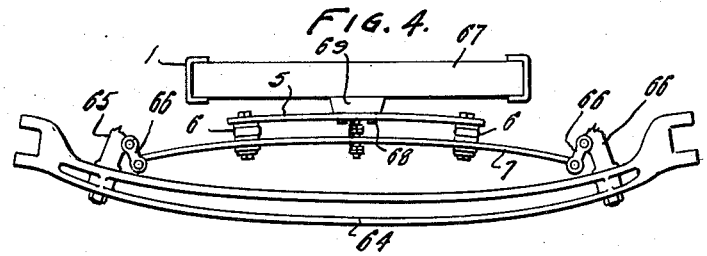
Figure 4 is an illustration in side elevation of the application of my system, using a transverse spring construction for the support of an automotive chassis.

Referring to the drawings, I have shown in Figure 1 a spring suspension for the front and a spring suspension for the rear of an automobile chassis. The suspensions are somewhat similar, but different in detail.

Referring to the front end suspension, I have shown an automobile chassis 1 and a front axle 2 having thereon a spring pad 3 to which is suitably bolted by bolts 4 (see Figs. 2 and 3) a leaf spring member 5 comprising two arms of even taper from the widest point at the middle to the ends. At the ends of the arms of the leaf spring member 5, I have shown rubber force transmitting units 6 which support an upper longer spring 7 at two points 8 and 9. The force transmitting units 6 are held in place by bolts 10 carrying lock nuts 11 at their lower ends. The bolts 10 fit through holes drilled through the lower spring 5 and the upper longer spring 7. Fitting in these holes in the spring member 7 are cylindrical extensions 13 of cups 12. The cylindrical extensions fit within the holes in the spring member 7.

Washers 14 are placed between the heads of the bolts 10 and the upper surface of the upper spring 7. Fitting within the cups 12 are rubber cushions 15. The rubber cushions 15 fit in cups 16 formed with cylindrical extensions 17 that fit within the holes in the lower spring member 5. Another cup member 18 having a cylindrical extension 19, which latter also fits within the holes in the lower spring member 5, is adapted to hold a rubber member 21. A large washer 22 holds the rubber member 21 in the cup 18. The lock nuts 11 hold the assembly together.

Thus, any movement of one element of the system is transmitted to the other through rubber force transmitting units, which, of course, cushion the jar and eliminate friction, since the rubber connection is in a large measure non-frictional. Moreover, it is to be noted that under ordinary conditions it is only necessary to have two leaves to a spring, though more can be used.

The upper spring 7 is tapered at 23 from the point where the force transmitting members 6 are positioned to the ends, and the ends of the spring 7 are curled up at 24 to hold a sleeve or bushing 25 at one end, and a sleeve or bushing 26 at the other end. The sleeve or bushing 26 carries a spring shackle 27 which is pivoted to another link 28 at its upper end, the upper link 28 being held in a support piece 29 carried by the chassis. The sleeve or bushing 25 is held, in accordance with the usual practice, in the downwardly curved portion 31 of the chassis.

It will be noted that the lower spring 5 is weakened from its middle section towards its ends, and that the upper spring 7 is weakened from a point where are located the force transmitting members between the springs to its ends. This weakening of the spring does not affect its operation, but in fact constitutes economy in material and weight which can be effected from the use of my system.

The spring 7 is provided with an aperture 32 through which passes a screw-threaded rod 33 which is screw-threaded into the axle 2 at its lower end. A nut 34 holds the rod 33 firmly in upright position and tends to hold together the spring 5 and the axle 2. Mounted above the nut 34 are lock nuts 35 having a rubber washer 36 above them. Above the spring 7 are located two other lock nuts 37 and a rubber washer member 38. These lock nuts can be adjusted to move the position of the washers 36 and 38. Each of these two washer and lock nut assemblies constitutes a stop member. The stop arrangement above the spring 7 is the compression stop; the stop arrangement below the compression spring 7 is the rebound stop.

Referring to Figures 12, 13 and 14, it will be seen that in Figure 12 there is a single leaf spring which is shown to bend under compression, in accordance with a dotted line. In Figure 13 is a diagrammatic illustration of the assembly which I have just described in greater detail. It will be noted that the lower spring 5 is bent down somewhat under compression, and that the upper spring 7 is bowed. The upper spring 7 will not bend downwardly, however, as much as the spring in Figure 12, because it is supported at two points remote from its center, and is stiffer in its action, permitting relatively light material to be used. The middle of the spring 7 has been pushed up beyond its normal position, as is clearly apparent in Figure 13.

In Figure 14 the spring 7 has hit the stop arrangement, and the bow of the spring, as indicated by the dotted lines, has started to flatten out. This upper stop acts to change the period of the spring 7 and also greatly stiffen its action. On the rebound the lower stop would tend to prevent the spring 7 from bowing too far in the other direction, and would stiffen its action in that direction of flexing.

The period of the lower spring is different from that of the spring 7 before the spring 7 hits the stops. The stops introduce another variable into the system, since they change the period of the spring 7, in fact, making it perform as two springs. These various periods of vibration tend to damp each other and remarkably excellent results are achieved through the non-synchronous action just described.

In Figure 15, I have shown how an ordinary leaf spring operates. In placing the load on the spring, the spring deflects in accordance with the straight line curve indicated by the upper diagonal line on the graph. In releasing the load, the spring flex is as shown in the curved lower line. It is the inter-leaf friction between the leaves of the spring that prevents the return curve from being the same as the curve during the increase of the load. This inter-leaf friction presents grave complications in spring arrangements, since it will be seen there are dead spaces at different points of the curve where there are no spring actions. For instance, if the ordinary spring is flexed to five hundred and forty pounds, there would be no spring action apparent until the weight has been reduced below four hundred and thirty. Where sudden shocks or jars are encountered, as is the case with any road vehicle, this interleaf spring friction is tremendously multiplied by reason of inertia and other factors.

Referring to Figure 16, I have shown, as indicated, a graph plotting the load in pounds against the total deflection in inches, and have shown a deflection curve in dotted lines for a conventional multi-leaf spring. This curve is shown as a straight line. For simplicity, inter-leaf friction is not indicated. The static load for one spring is indicated as five hundred pounds. The form of spring which I have just described is shown in comparison to the conventional multi-leaf spring. In the graph, my spring is shown as adjusted for a static load of five hundred pounds, with the stops set to come into action, either on load deflection or rebound, at one hundred pounds on either side of the normal static load. The deflection range, therefore, is from six hundred to four hundred pounds between the stops, and it is to be noted my spring is more resilient than the conventional type of spring. On compression at six hundred pounds, the compression stop comes into play, and the spring stiffens so that the total deflection at, for instance, thirteen hundred pounds, is far less than for the conventional spring.

Likewise, the rebound stop is set for four hundred pounds, and the total deflection from four hundred pounds to zero is less than is the case with the conventional spring.

Figure 17:
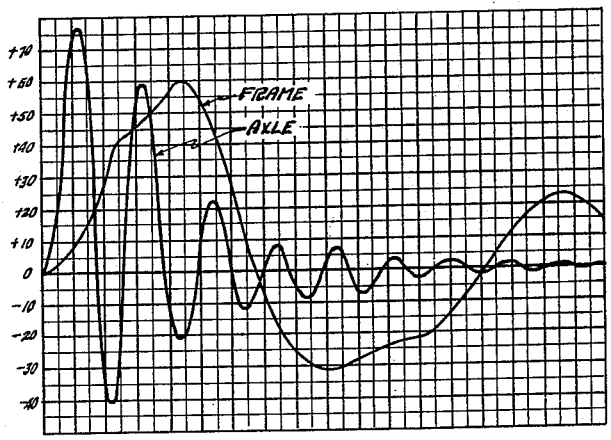
Figure 17 is a graph showing the vibration of a frame of a car and an axle in which a conventional multi-leaf spring is used without a shock absorber.

Referring to Figure 17, I have shown graphically the movement of frame and axle of a car using a conventional spring without shock absorbers. The zero line indicates the normal position of either frame or axle, and the vibrations are indicated in wave form, the waves indicating the movement of a fixed point on the frame or axle against a moving background. It will be noted, that the axle has a large initial movement, and that the decrease in amplitude is not sudden. The line indicating the frame movement shows a large initial amplitude, and here the rate of attenuation is even more gradual than with the axle.

Figure 18:
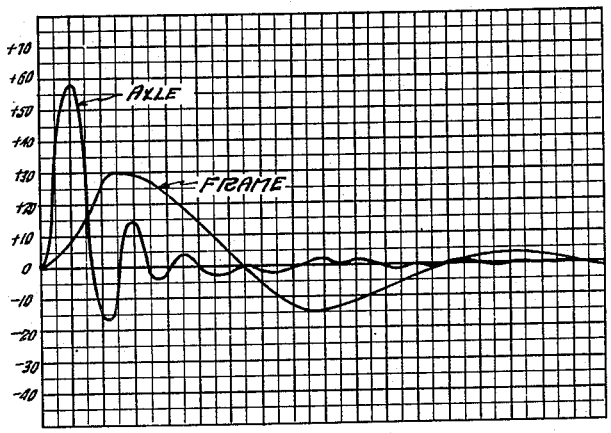
Figure 18 is a graph showing the action of the conventional multi-leaf spring with a shock absorber.

Referring now to Figure 18, where I have shown a conventional spring with a shock absorber, the rate of attenuation of vibration of the axle is considerably greater than is the case in Figure 17. Likewise, the frame has a higher rate of attenuation in its vibrational movements. Moreover, neither the frame nor the axle has as high initial movement as was the case without shock absorbers. There is improvement in the movement of the frame when compared with the movement of the axle in respect to the factor of initial amplitude over the conditions shown in Figure 17.

Figure 19:
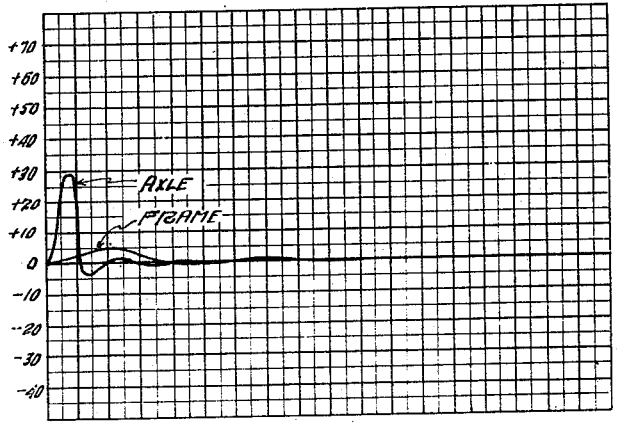
Figure 19 is a graph showing the vibration of the axle and frame of a car when using my invention, for instance, the form shown in Figure 1.

In Figure 19, I have shown my form of spring suspension. It will be noted that the axle has a very much less initial movement than in either of the other two instances depicted in Figures 17 and 18, and that the rate of attenuation of movement is very rapid. The frame shows a tremendous improvement over the conventional system, even when equipped with shock absorbers. The rate of attenuation of movement of the frame is extremely rapid, and the initial amplitude small. These curves show what may be expected in practice.

Referring again to Figure 1, I have shown a rear spring assembly for the automobile chassis, which comprises a somewhat similar spring arrangement, in which the chassis is supported by the spring 7 which is now in the lowermost position, the short spring 5 being in the uppermost position. The spring 7 is pivotally supported at one end to a member 41 carried by the chassis frame 1. There is provided a downwardly extending portion 42 of the chassis frame 1 to which the other end of the spring 7 is attached through the spring 5 is carried on a spring a shackle 43. The spring 5 is carried on a spring pad 44 which is suitably bolted to the spring 5. A compression stop 45, of a construction similar to that already described in connection with the spring support of the front part of the chassis, is provided. There is also a rebound stop 46. Between the short spring 5, which is in the uppermost position, and the longer spring 7, which is in the lowermost position, there are rubber mounted shackle members 47, whose construction is illustrated more in detail in Figures 10 and 11.

Each of these members comprise shackle arms 48 jointed together by shackle bolts 49. The heads of the bolts 49 may be recessed, as indicated at 51, in the shackle arms. The bolts are provided with nuts 52 at the opposite end, and washers 53, which may be of the lock washer type. Recessed within the shackle arms 48, and surrounding the shackle bolts 49, are bushings 54 provided with beading 55. Over the bushings 54, fit cylindrical rubber pieces 56 which are held in place by the beading 55. Over the cylindrical rubber pieces 56 are exterior metallic coverings 57 which act as bushings between the rubber members 56 and holding members 58. The holding members 58 are cushioned from contact with the shackle arms 48, by rubber washers 59. The holding members 58 are riveted, or otherwise suitably attached, to the upper spring 5 and the lower spring 7, and there are provided holding cups 61 which form upper and lower cup members, between which are positioned rubber members 62. The cup members 61 are held by the rivets, which I have indicated at 63, firmly against the springs 5 and 7.

The whole assembly presents a resilient linkage between the spring 5 and the spring 7.

It is to be noted that in the form of spring system for both front and rear axle assemblies, which I have described, the shocks transmitted to the system through the rebound and compression stops are absorbed by the axle. This is the preferred form of my invention, and constitutes a refinement which I have found makes for easy riding qualities.

In Figure 4, I have shown a form of my invention as applied to a transverse spring arrangement for a vehicle, such as is common in Ford spring suspension, and others of that type. In this form of device an axle is shown at 64. This axle carries upright members 65 to which are pivoted spring shackle members 66. The spring 7, the larger one of the system, is attached to the shackles 66 at its ends. The supported member, which is the vehicle chassis in this case, is indicated at 67. The shorter spring 5 is bolted or otherwise held at 68 to a support member 69 attached to the chassis frame. In this instance, the jars imparted through the system by reason of the operation of the compression and rebound stops would pass into the supported member, namely the frame, and in that respect this particular form is not as effective as that described in connection with Figure 1.

Figure 5:
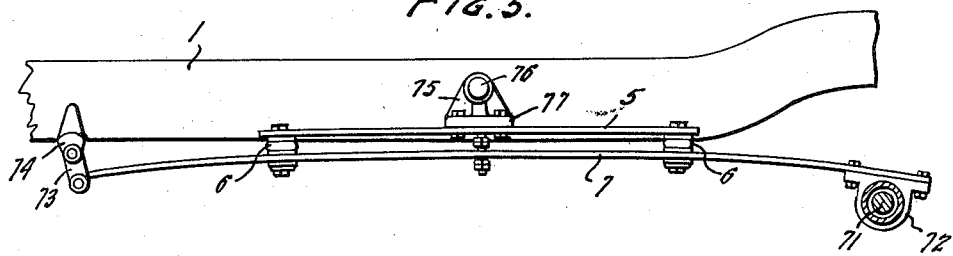
Figure 5 is a side elevation showing the application of a cantilever spring suspension utilizing my invention.

In Figure 5, I have shown a spring construction embodying my invention, using a cantilever spring arrangement. In this case, an axle member 71 carries a spring pad 72 to which is bolted, or otherwise attached, one end of the long spring 7. The other end of the long spring 7 is attached to a spring shackle 73. The other end of the shackle 73 is attached at 74 to the vehicle frame. Attached to the vehicle frame is a support member 75, suitably pivoted at 76. The member 75 is provided with a spring support piece 77. The spring support 77 is bolted to the shorter spring 5. Suitable force transmitting units 6 of the type described in connection with the front end spring arrangement for Figure 1 are shown. The same type of force transmitting units 6 can also be utilized with the form of invention shown in Figure 4.

Figure 6:
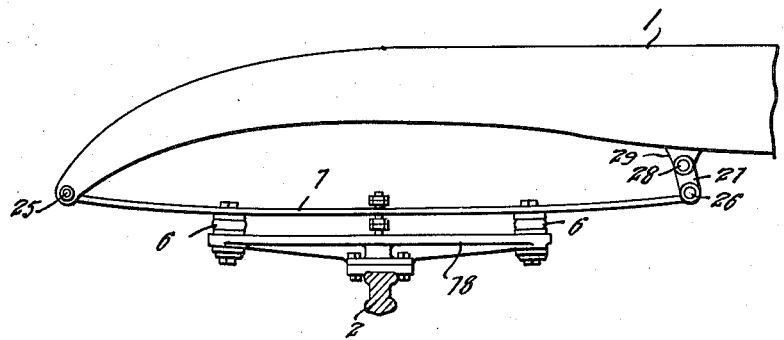
Figure 6 is a modification of my spring system showing a rigid auxiliary support, the view being in side elevation.

Referring to Figure 6, I have shown a construction in which the shorter spring member is eliminated. The suspension is otherwise similar to that for the front end of Figure 1. The lower member instead of being a flexible spring 5 is an elongated support piece 78 of rigid construction. In this form, the advantages of the short spring section cooperating with the longer leaf are not present. Other advantages are present. There is elimination of inter-leaf friction. There is present the adjustable stop feature which permits the change in periodicity of the long spring and makes for easy riding quality of the system, allowing great resilience near the point of normal static load with the stiffening action at the point of introduction of the action of the stops.

Figure 7:
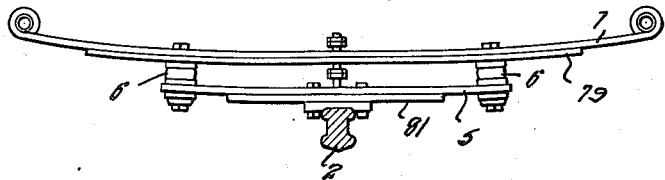
Figure 7 is a side elevation of a form of my invention in which there are a plurality of leaf springs in each element of the vibrating system.

In Figure 7 I have shown a form of spring similar to that used at the front end of the chassis in Figure 1, with the exception that the spring member 7 has interposed between it and the force transmitting members 6 a shorter leaf spring 79. Similarly the leaf spring 5 has interposed between it and the axle a shorter leaf spring 81. The action of this system is similar to that described in connection with the front axle arrangement of Figure 1. The shorter springs 79 and 81 do not introduce large interleaf friction factors, and under certain conditions the form shown in Figure 7 is entirely satisfactory.

In Figures 8 and 9 I have shown a form of spring similar to that shown for the support of the front of the chassis in Figure 1, with the exception that the springs 5 and 7 are not tapered. Where the springs are not tapered, the action of the system is somewhat stiffer than that described in connection with the form shown in Figure 1, and for heavy duty use the nontapered form of spring construction may be preferable.

Referring to the form of invention shown in Figures 20, 21 and 22, I have shown an arrangement for adjusting the position of the compression and rebound stops for the front spring suspension from the dashboard of the car. In this arrangement I have shown a Bowden wire construction 82 adapted to be rotated by means of a handle or knob 83, suitably mounted on the dashboard of the car. The Bowden wire construction 82 comprises the usual flexible sheath 84, and a wire proper 85. It is the wire proper 85 which is rotated by the handle 83. The flexible sheath 84 is brazed, or otherwise attached, to a head piece 86, into which is screwed a clamping flange 87 provided with an interior shoulder 88. The clamping flange is so formed as to permit a turning head 89 to rotate within the flange the turning head 89 being formed with a shoulder engaging the shoulder 88 of the clamping flange 87 to hold the turning head 89 in position, as indicated in Figure 21.

There is provided a stop adjusting shaft 91, which has a reduced screw-threaded portion 92 which is held in screw-threaded engagement with the turning head 89. The Bowden wire proper 85 has a key head 93 which is keyed at 94 to the end of the stop adjusting shaft 91.

It will be apparent that by rotating the handle 83, the wire 85 is caused to rotate, causing the turning head 89 to rotate within its supporting structure. This causes rotation of the stop adjusting shaft 91. The lower end of the stop adjusting shaft 91 is adapted to rotate in an aperture 95 in the axle 1. The spring 5 is held against the axle 1 by a retaining plate 96 which is bolted against the top of the spring 5 by bolts 97 which are held in place by nuts 98, which have mounted between them and the axle 1 lock washers 99. The retaining plate 96 is provided with a shouldered annular recess 101, which fits over a collar 102 formed on the stop adjusting shaft 91, permitting the stop adjusting shaft 91 to rotate freely upon turning of the handle 83 to rotate the Bowden wire proper 85.

Upstanding guide rods 103 are held upright by the retaining plate 96. They may be welded, or otherwise attached, to the plate. There is provided an upper nut 104, which serves as a compression stop member for the system, and a lower nut 105, which serves as a rebound stop member for the system. The upper nut 104 is screw-threaded to a reduced portion of the stop adjusting shaft, and the lower nut 105 to a somewhat enlarged portion of the stop adjusting shaft which is screw-threaded in the opposite direction to that upon which the nut 104 fits. Both of these portions of the shaft are screw-threaded so that the nuts 104 and 105 can be screwed up and down to adjust the position of the compression and rebound stops. The nuts move in opposite direction on the stop adjusting shaft 91. Suitably attached to the lower face of the compression stop 104 is a rubber washer 106, and attached to the upper face of the rebound stop 105 is a rubber washer 107. The nuts 104 and 105 are provided with keywayed ears 108 and 109, respectively, which fit over the guide rods 103 to permit the nuts 104 and 105 to be screwed up and down along the stop adjusting shaft, while they are prevented from rotating by reason of the engagement of the keywayed ears 108 and 109 with the guide rods 103.

The handle 83 upon rotation will, through the Bowden wire proper 85, cause the stop adjusting shaft 91 to be rotated, and this will cause the compression and rebound stop members to be screwed up or down on the stop adjusting shaft to adjust the system as desired.

In Figures 23 and 24, I have shown a mechanism for automatically adjusting the position of the rebound stop in proportion to the amount of flexion given the system on the initial compression cycle. The arrangement provides for a bracket member 111 which is bolted at 112 to the chassis frame 1. The bracket member 111 is provided at its inwardly projecting end with a socket arrangement 113 into which is adapted to fit a ball head 114 through which slides an operating rod 115. The operating rod has keyed to it an operating collar 116 for a purpose to be described. The lower end of the operating rod 115 is pivoted at 117 to one arm of a bell crank 118.

The middle of the bell crank is pivoted at 119 to a support 121 formed on a base plate 122. The base plate 122 is provided with a shoulder 123 which fits over the lower spring 5. The base plate 122 is held on the spring 5 by means of bolts 124 which pass through the plate 122 and the support on the axle 2 to hold it in place. The end of the arm of the bell crank which is not pivoted to the operating rod at 117 is pivoted at 126 to a link 127, which is in turn pivoted to a wedge-shaped cam member 128 at the point 129. The wedge-shaped cam member 128 is provided with a central slot 131. The wedge-shaped cam member 128 can be reciprocated by action of the operating rod 115, which, through the bell crank connection, may move the wedge-shaped cam member 128 along the upper surface of the base plate 122.

The wedge-shaped cam member 128 is provided with keys 125 (see Fig. 23) which fit in slots 132 formed in the base plate 122 to permit the reciprocation of cam member 128.

Suitable resilient frictional holding means, not shown, can be provided to hold the wedge-shaped cam member 128 in position. The screw-threaded rod 33 is screwed at its lower extremity into the axle 2, and held in position by a holding nut 133. At the upper portion of the rod 33 is the compression stop assembly which has previously been described in connection particularly with the detailed view shown in Figure 2.

The rebound stop mechanism comprises in part a wedge-shaped member 134 which is bolted by bolts 135 to the under side of the spring member 7. This member is faced at its lower surface with rubber, at 136.

By reciprocating the wedge-shaped cam member 128, the position for application of the rebound stop can be varied in accordance with whether the member 128 lies well to the right, for instance, in the view shown in Figure 24, or far to the left. The rebound stop mechanism is set in operation by the downward flexing of the spring 7, which causes the rubber middle of the surface 136 to contact with the wedge-shaped cam member 128, thus permitting no further rebound and acting as a rebound stop. The aperture or slot 131 in the member 128 permits it to be slid back and forth in its slide within certain limits without contacting the rod 33.

The base plate 22 is provided with an upright support piece 137 through which passes, in a screw-threaded engagement, a stop screw 138, whose position can be controlled by lock nut 139. With the parts shown in the position as indicated in Figure 24, the link member 121 contacts with the end of the stop screw limiting its position to the right.

By adjusting the stop screw, the normal position (i. e. the one to the right of Figure 24) of the wedge shaped cam member 128 can be regulated.

Now returning to operating rod 115, I have shown on the portion of the rod projecting above the ball member 114, a fixed collar 141 carrying a helical spring 142, surrounding the operating rod 115, which, at its lower end, carries a movable collar 143. The arrangement is such that normally the rod 115 will be held in such a position by the pressure of the spring 142 as to maintain the link 121 in contact with the stop screw 138, thus holding the wedge-shaped cam member 128 in the position indicated in Figure 24.

Now let us assume that the car goes over a heavy bump and the compression cycle is large enough to cause the axle to be moved upward to a sufficient extent to cause the collar 116 to contact with the ball member 114. This will cause the rod 115 to be shoved downwardly, causing the bell crank lever 118 to be moved to move the wedge-shaped cam member 128 to the left, in view Figure 24, to cause the rebound stop to act at an earlier stage in the rebound cycle than would be the case had the collar 116 not engaged with the ball member 114. The action is automatic. If a large bump is encountered, the rebound cycle is advanced by reason of the more than usual compression forces acting on the spring. Under certain conditions of operation, this presents inherent advantages.

When the rod 115 is shoved in its downward position, the force of the spring 142 is not sufficient to immediately jerk the wedge-shaped cam member 128 to the right as indicated in Figure 24. Because of the inertia of the system and the relative weakness of the spring, the rebound cycle will be in operation before the wedge shaped cam member 128 has had much chance to move from the position to the left to which it had been moved under the force exerted through the rod 115 when the collar 116 engaged the ball member 114. In the rebound cycle as soon as the rubber face 136 contacts the wedge shaped cam member 128 it no longer can reciprocate, and is held in frictional engagement with the rubber face 136 until that part of the rebound cycle is completed—which will permit rubber face 136 to no longer be in contact with the adjacent face of the cam member 128.

At that point in the rebound cycle, the tension of the spring 142 draws rod 115 upwardly to cause the link 127 to contact the stop screw. Thus the device is again in normal operation so that the rebound stop will be operative in the rebound cycle at its normal point in that cycle. But when a more than ordinarily large shock is imparted to the system the operation of the mechanism just described will cause the rebound stop to be operative at a point in the rebound cycle which is earlier than the normal.

From the preceding description of my invention, it will be apparent that I have devised a spring system which eliminates interleaf friction and attendant disadvantages, while at the same time providing a self-dampening effect. The self-dampening effect takes place by reason of the change in period of the system, as well as the interaction of separate vibrating units in the system having different initial periods.

My device permits a system having great flexibility at points near the normal load capacity, but has a stiffening of the action at predetermined points on either side of the normal load. By reason of the construction employed the loads which may be carried by the system are large in proportion to the weight of spring material used. By control means, the operation of the system can be regulated to the desired performance under the existing conditions, and this control may be in part automatic.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a device of the character described, a supported member, a support member receiving the shocks, a spring member carried by the support member and attached by flexible means to the support member, and means carried by the support member to change the period of vibration of the spring member at a predetermined point in its flexion.

2. In a device of the character described, a supported member, a support member receiving the shocks, a flexible elongate load carrying member carried on the support member and attached by flexible means to the support member, and means on the support member to change the period of vibration of the load carrying member at a predetermined point in its flexion.

3. In a device of the character described, a vehicle body, an axle receiving the shocks, a flexible metallic elongated leaf spring resiliently attached to the axle, and means carried by the axle to change the period of vibration of the spring at a predetermined point in its flexion.

4. In a device of the character described, a supported member, a flexible resilient spring member carrying the supported member, a support member having a plurality of spaced points of contact with the spring member intermediate the ends thereof, and flexible means to flexibly attach the spring member at said spaced points of contact.

5. In a device of the character described, a supported member, a flexible resilient spring member carrying the supported member, a support member having at least two spaced points of contact with the spring member intermediate the ends thereof, and flexible means to flexibly attach the spring member at said spaced points of contact.

6. In a device of the character described, a vehicle body, a metallic spring, an axle, a support for the spring carried by the axle and furnishing two spaced points of support for the spring intermediate the ends thereof, and flexible means to flexibly attach the spring member at said spaced points of contact.

7. A spring support comprising a spring having a plurality of leaves out of contact with each other for a substantial portion of their length whereby interleaf friction is largely eliminated, and support means resiliently connected to at least one of the leaves, and means whereby the period of at least one of the leaves is changed at a predetermined point in its flexion.

8. A device of the character described, and in combination, a vehicle body, an axle receiving the road shocks, a spring having a plurality of leaves out of contact with each other for a substantial proportion of their length whereby interleaf friction is largely eliminated, and support means carried by the axle and resiliently attached to at least one of the leaves, and means whereby the period of vibration of at least one of the leaves is changed at a predetermined point in its flexion.

9. A spring support comprising a spring having two leaves, one supporting the other and arranged out of contact with each other for a substantial portion of their length whereby interleaf friction is largely eliminated, and support means resiliently attached to at least one of the leaves, and means whereby the period of vibration of at least one of the leaves is changed at a predetermined point in its flexion.

10. A spring support comprising a spring having two leaves, one supporting the other, arranged out of contact with each other for a substantial portion of their length, rubber cushion means between the two springs resiliently attaching them together at the points where the lower spring supports the upper, and damper means whereby the period of at least one of the leaves is changed at a predetermined point in its flexion.

11. A spring suspension comprising an elastic elongated spring member having points of attachment, a plurality of supports for said member intermediate said points of attachment, and stops intermediate the supports to arrest the motion of the adjacent part of said member when it is flexed about the supports in both directions to cause it to contact with the stops to change the period of vibration thereof and to stiffen its action.

12. A spring suspension comprising an elastic elongated spring member having points of attachment, a plurality of supports for said member intermediate said points of attachment, and a stop intermediate at least two of the supports and substantially midway therebetween to check the motion of said member when it is flexed about the supports to cause it to contact with the stop under compression forces to change the period of vibration thereof and to stiffen its action.

13. A spring suspension comprising an elastic elongated spring member, a plurality of supports for said member resiliently attached thereto, and a stop to arrest the rebound action of the spring member at the part of said member adjacent the stop to change the period of vibration of the spring and to dampen the rebound.

14. A spring suspension comprising an elastic elongated spring member, a plurality of supports for said member resiliently attached thereto, a rebound stop located between said supports and a compression stop located intermediate said supports.

15. A spring suspension comprising an elastic elongated spring member, two supports for said member resiliently attached to the spring member, a rebound stop, and a compression stop, both of said stops being located substantially half way between the two supports about which the spring is flexed to cause it to contact the stop.

16. In a spring device, the combination of an elongated spring member, a second shorter spring member supporting the first mentioned member at a plurality of points, and a stop intermediate such points of support whereby the period of vibration of the first mentioned member on compression is changed at a predetermined point of its flexion.

17. In a spring device, the combination of an elongated spring member, a second shorter spring member supporting the first mentioned member at a plurality of points, and stops limiting the movement of the first mentioned member in both directions of flexion, whereby its period of vibration and its stiffness are altered at predetermined points under the action of compression and of rebound forces.

18. In a spring device, the combination of an elongated spring member adapted to carry a load at its ends, a second shorter spring member supporting the first mentioned member at two points intermediate its ends, and stops limiting the movement of the first mentioned member in its flexion under both compression and rebound forces.

19. A spring suspension comprising an elastic elongated spring member having points of attachment, a plurality of supports for said member intermediate said points of attachment, and a stop intermediate the supports to arrest the motion of the adjacent part of said member when subjected to compression forces to change the period of vibration thereof and to stiffen its action, and means for adjusting the position of the stop to regulate the effects produced.

20. A spring suspension comprising an elastic elongated spring member having points of attachment, a plurality of supports for said member intermediate said points of attachment, a stop intermediate the supports to arrest the motion of the adjacent part of said member under rebound forces to change its period of vibration and to stiffen its action, and means for adjusting the position of the stop to regulate the effects produced.

21. A spring suspension comprising an elastic elongated spring member having points of attachment, two supports for said member intermediate said points of attachment, a rebound stop, a compression stop, both of said stops being located between the supports, and means for adjusting the positions of the stops to regulate the effect produced.

22. In a spring device, the combination of an elongated spring member adapted to carry a load at its ends, a second shorter spring member supporting the first mentioned member at two points intermediate its ends, a rebound stop effective on the first mentioned spring member, a compression stop, and means for adjusting the positions of the stops to regulate the effects produced.

23. In a device of the character described, a supported member, a support member receiving the shocks, a spring member resiliently attached to the support member and resiliently carrying the supported member, and means carried by the support member to change the rate of deflection of the spring member at a predetermined point in its flexion.

24. In a device of the character described, a supported member, a support member receiving the shocks, a flexible elongated load carrying member, spring supports carried on the support member, and stops on the support member substantially midway between the supports to change the rate of deflection of the load carrying member at a predetermined point in its flexion about the supports which cause its contact with the stops.

25. In a device of the character described, a vehicle body, an axle receiving the road shocks, a flexible metallic spring, flexible spring supports carried on the axle for flexibly carrying the spring and connected thereto, and stops carried by the axle to change the rate of deflection of the spring at a predetermined point in its flexion about the supports which cause its contact with the stops.

26. In a device of the character described, a vehicle body, an axle receiving the shocks, a flexible metallic elongated leaf spring resiliently carrying the vehicle body on the axle, flexible supports carried by the axle and upon which the spring is carried, and means between the supports carried by the axle to change the rate of deflection of the spring at a predetermined point in its flexion on both the compression and rebound cycles.

27. A spring support comprising a spring having a plurality of leaves out of contact with each other for a substantial portion of their length whereby interleaf friction is largely eliminated, means for flexibly attaching the leaves together, and stop means whereby the rate of deflection of at least one of the leaves is changed at a predetermined point in its flexion.

28. In a spring device, the combination of an elongated spring member having two points of attachment, a support for the spring member having a plurality of flexible points of contact therewith intermediate the points of attachment, and stops limiting the movement of the spring member in both directions of flexion about the points of contact which bring the spring into engagement with the stops, whereby its period of vibration and its stiffness are altered at predetermined points under the action of compression and of rebound force.

29. In a spring device, the combination of an elongated spring member having two points of attachment, a vehicle body, an axle, flexible support means on the axle for supporting the spring member at a plurality of points intermediate the points of attachment, and stops limiting the movement of the spring member in both directions of flexion, whereby its period of vibration and its stiffness are altered at predetermined points under the action of compression and rebound forces, after the support means have caused the spring to engage the stops.

30. A spring suspension comprising an elongated leaf spring member, a rigid support beam, two flexible support members on the support beam which carry the elongated leaf spring member, means for attachment of the elongated spring member at points outside the two support members, and stop members carried by the support beam limiting the movement of the spring member on both compression and rebound cycles to stiffen the rate of deflection of the spring.

31. A vehicle support suspension comprising an axle, a rigid beam fixedly attached to the axle, support members attached to the rigid beam at points on either side of the axle, a leaf spring supported on the support members and adapted to carry a load supported at the ends of the spring and means to permit the support members to have longitudinal movement in the direction of the length of the spring upon deflection of the spring.

32. In a spring device, the combination of an elongated spring member adapted to carry a load at its ends, an inflexible support member having auxiliary flexible supports which contact the elongated spring member at two points intermediate its ends, and stops carried by the support member limiting the movement of the spring in its flexion under both compression and rebound forces.

33. In a spring device, the combination of an elongated spring member comprising a plurality of leaves adapted to carry a load at its ends, a shorter spring member comprising a plurality of leaves supporting the first mentioned member at two points intermediate its ends, a rebound stop effective on the first mentioned spring member, a compression stop, and means for adjusting the position of the stops to regulate the effects produced.

34. In a spring device, the combination of an elongated spring member comprising a plurality of leaves, a second shorter spring member comprising a plurality of leaves supporting the first mentioned spring member at a plurality of points, and stops limiting the movement of the first mentioned member in both directions of flexion whereby its period of vibration and its stiffness are altered at predetermined points under the action of compression and rebound forces.

35. A connection for springs comprising two springs, a resilient mass, means to hold the resilient mass in place between the two springs, a shackle member, and resiliently lined journaled members on each spring in which the shackle is journaled to resiliently hold the springs in spaced relationship.

36. A connection for springs comprising two springs, holding means on each spring, a resilient mass held by the holding means and lying between the springs, a shackle member, and resiliently lined journaled members on each spring in which the shackle member is journaled to resiliently hold the springs in spaced relationship.

37. A suspension for springs comprising a support, a spring, a holding member on the spring, a holding member on the support, a resilient mass held between said holding members, a holding member on the side of the support away from the spring, a resilient mass held in said holding member, and a coupling member flexibly uniting spring and support and permitting functioning of the resilient masses.

38. In a spring support, stop means, a spring having a plurality of leaves out of contact with each other for a substantial portion of their length whereby interleaf friction is largely eliminated, link means for suspending the leaves out of contact, said stop means operating to change the rate of deflection of at least one of the leaves at a predetermined point.

39. In a device of the character described, a supported member, a support member receiving the shocks, a spring member carried by the support member, flexible means attaching the spring to the support member, and means carried by the support member to change the displacement under load to give large displacement at loads near normal and small displacement at greater loads.

40. In a device of the character described, a supported member, a flexible resilient spring member carrying the supported member, a support member having a plurality of spaced points of contact with the spring member intermediate the ends thereof, and flexible means to attach the spring member at at least one of said spaced points of contact.

41. In a device of the character described, a supported member, a flexible resilient spring member carrying the supported member, a support member having at least two spaced points of contact with the spring member intermediate the ends thereof, and flexible means to attach the spring member at at least one of said spaced points of contact.

42. In a device of the character described, a vehicle body, metallic spring and axle, a support for the spring carried by the axle and furnishing two spaced points of support for the spring intermediate the ends thereof, and flexible means to attach the spring member at at least one of said spaced points of contact.

43. In a device of the character described, a supported member, a flexible resilient spring member carrying the supported member, a support member having at least two spaced flexible points of contact with the spring member intermediate the ends thereof, such spaced points of contact being so positioned with respect to the supported member and to the length of the spring that approximately half the weight of metal of the spring may be employed that would otherwise be employed if one support only were used for the spring, at least one of said support points comprising a flexible attachment to the spring.

EDWARD F. ZAPARKA.